Figure 1:
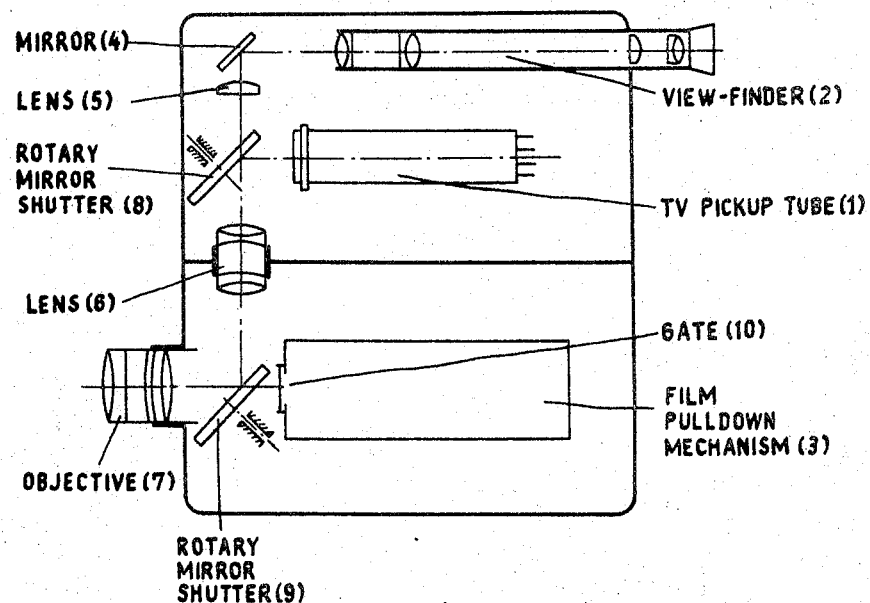

Dec. 10, 1963 K. SIEPMANN ETAL 3,114,002
COMBINED TELEVISION AND CINEMATOGRAPHIC CAMERA
Filed Jan. 4, 1961 3 Sheets-Sheet 1

Inventors:
Karl Siepmann
Richard von Felgel-Farnholz
by Michael S. Striker
Attorney Inventors:
Karl Siepmann
Richard von Felgel-Farnholz United States Patent Office 3,114,002
Patented Dec. 10, 1963

3,114,002
COMBINED TELEVISION AND CINEMATOGRAPHIC CAMERA
Karl Siepmann, Darmstadt, and Richard von Felgel-Farnholz, Darmstadt-Eberstadt, Germany, assignors to Fernseh G.m.b.H., Darmstadt, Germany
Filed Jan. 4, 1961, Ser. No. 80,571
Claims priority, application Germany Jan. 8, 1960
14 Claims. (Cl. 178—6.8)

This invention relates to a combined television and cinematographic camera which includes an optical finder and a device which alternately at times establishes an optical path to exposure of a film and at times blocks this optical path during the pulldown of the film.

In many film cameras there is included a rotary mirror shutter which at times opens the optical path from the objective lens to the film so as to expose the latter and at other times reflects this optical path so that an image of the scene being recorded becomes visible in the optical finder. The film is then pulled down during the period in which the optical path is being reflected. The rotary mirror shutter is usually formed in two symmetrical halves and its speed is chosen such that it makes one half-turn during each film frame period, that is during one cycle of the claw mechanism used for film pulldown. One operating cycle of the claw mechanism is usually taken as corresponding to 360°. On this assumption it will be seen that the exposure of the film occurs during a period of time corresponding to 180° and the illumination of the finder is effected during the remaining 180°.

In many combined television and cinematographic cameras there is likewise employed a rotary mirror-shutter which during a period corresponding to an angle of some 120° effects the exposure of the film and during other periods each corresponding to an angle of 60° effects the illumination both of the television pickup tube and of the optical view-finder. This arrangement is necessary to provide similar conditions in the television pickup tube during the two interlaced scannings of its target by the electron beam which occur during one frame period. Thus in this arrangement the optical path is used to expose the film during one-third of the available time and during another one-third of this time it is used to illuminate the finder and the television camera, while during the remaining one-third of the time it is unused. In addition to the disadvantage resulting from the thus inevitable loss of light, further division of the available light must be effected between the optical finder and the television camera, for example by means of partially-transparent reflectors, so that a further loss of light results.

It is an object of the present invention to provide a method for operating a combined television and cinematographic camera by which the whole, or substantially the whole of the available light is made use of and the loss of light resulting in the known arrangements is avoided.

It is a further object of the present invention to provide means by which the period of illumination of the view-finder is interrupted in order to avoid flicker.

It is still a further object of the present invention to provide special means by which the periods are varied during which the various optical paths are established.

According to the present invention there is provided a combined television and cinematographic camera comprising cyclically operable means for establishing during mutually exclusive periods of time optical paths from a common objective lens to the exposure gate of a film pulldown mechanism, to the photosensitive member of a television pickup tube and to an optical finder.

In carrying out the invention it is usually advantageous to arrange that the three optical paths are established for periods of time which in each case correspond to a third of the periodic time of one film frame, that is of one picture period of the television scanning process. By this means the whole, or substantially the whole of the available light is made use of and the loss of light resulting in the known arrangements is avoided.

An advantageous way of carrying out the invention is to couple together two rotary mirror-shutters, of which the speeds and phase angles are so arranged that the optical path from the common objective lens is at some times allowed to pass by the first mirror-shutter and at other times is reflected by the first mirror-shutter towards the second mirror-shutter, by which in turn it is at some times allowed to pass and is at other times reflected.

Figures 2, 3:
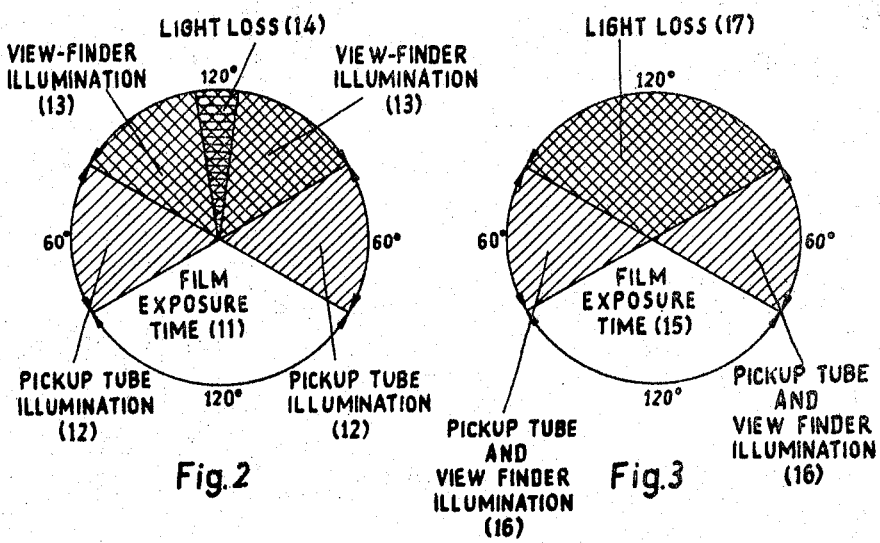
Figure 6:
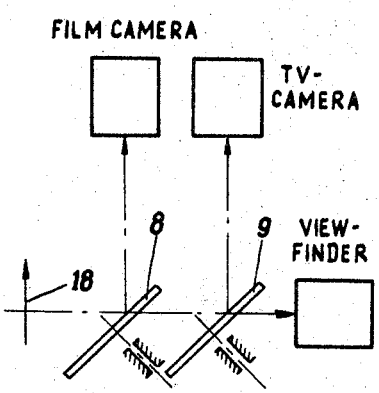
Figure 7:
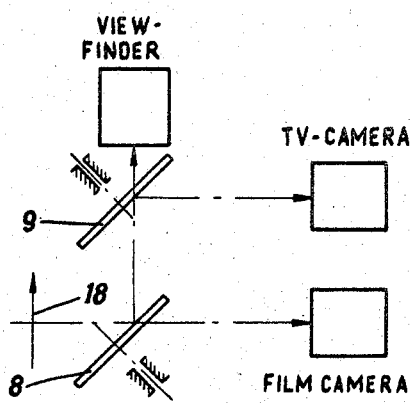
Figure 8:
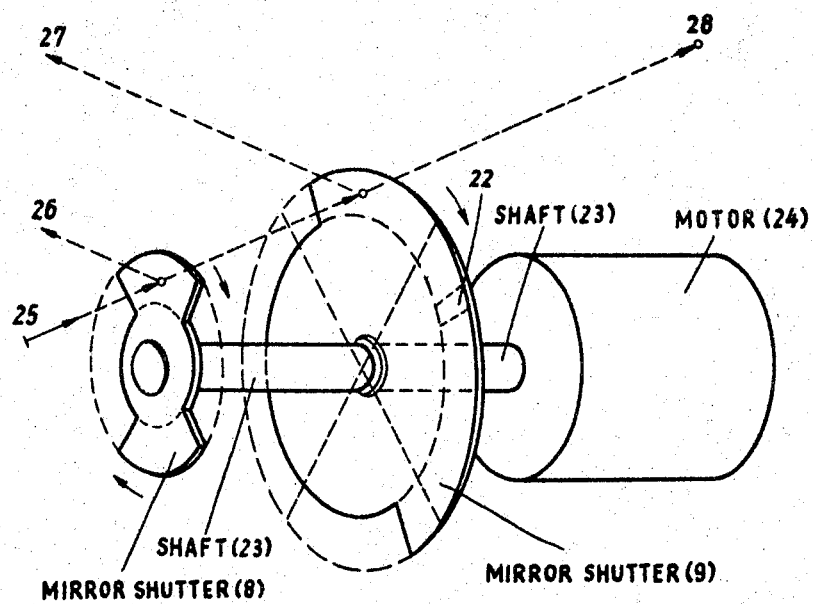
Figure 9:
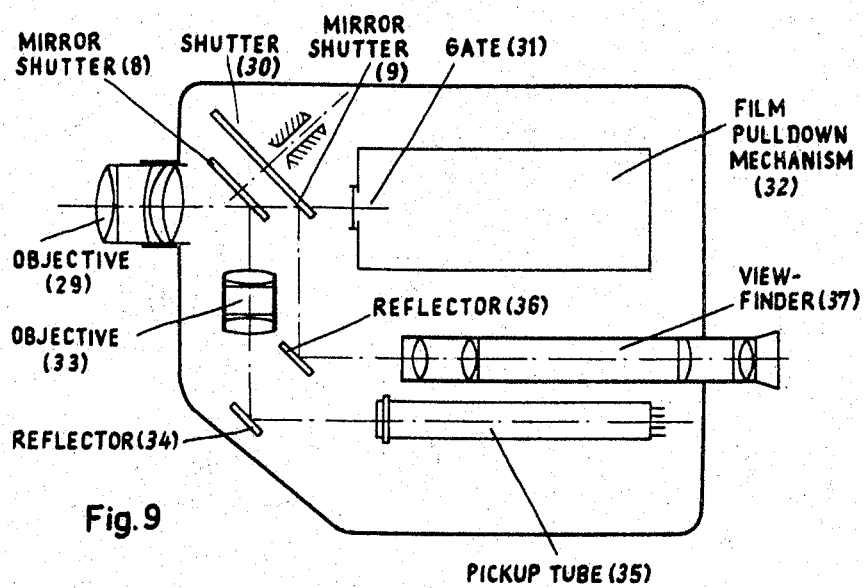

The invention will now be further described with reference to the accompanying drawings, comprising FIGURES 1 to 9, in which like elements are designated by like reference numerals in all figures and of which:

FIGURE 1 illustrates by way of example one embodiment of a combined television and cinematographic camera according to the invention, FIGURE 2 is a timing diagram illustrating the operation of a combined television and cinematographic camera according to the invention, FIGURE 3 is a timing diagram illustrating the operation of a known type of combined television and cinematographic camera, FIGURES 4 to 7 show a series of diagrams illustrating possible alternative arrangements of optical path in a combined television and cinematographic camera according to the invention, FIGURE 8 is a perspective drawing illustrating one embodiment of drive arrangement for two rotary mirror-shutters used in a combined television and cinematographic camera according to the invention and FIGURE 9 illustrates another embodiment of combined television and cinematographic camera according to the invention and including the device illustrated in FIGURE 8.

The combined television and cinematographic camera shown in FIGURE 1 employs a common objective lens 7 which is arranged to image light from the object (not shown) in the plane of the exposure gate 10 of a film pulldown mechanism 3. At times the optical path from objective 7 to gate 10 is blocked by a rotary mirror-shutter 9 in order to allow the film in gate 10 to be pulled down by mechanism 3. When this occurs the optical path is deflected upwards passing at times the second rotary mirror-shutter 8 and being at times again deflected by this same rotary mirror-shutter 8, to form an image of the object in the plane of the photosensitive member of a television pickup tube 1. When the rotary mirror-shutter 8 allows the light from lens 6 to pass undeflected, then the relay lens 5 and a mirror 4 direct the light into the optical view-finder 2 in which an image of the object is made visible to the operator.

A temporal separation of the optical paths from the objective 7 to the television pickup tube 1, optical view-finder 2 and film pulldown mechanism 3 is thus effected, the three paths being established during mutually exclusive intervals of time. Obviously it is necessary for the movements of the rotary mirror-shutters to be synchronized with that of the pulldown mechanism, so that the shutter 9 deflects the optical path from the exposure gate at those periods when the film is pulled down by the mechanism 3, and that while the light is so deflected it is at some times deflected upon the television pickup tube 1 by rotary mirror-shutter 8 and at other times is allowed to illuminate the optical view-finder 2.

The operation of the camera shown in FIGURE 1 is further illustrated by the timing diagram of FIGURE 2, in which 360° represents one cycle of operation of the pulldown mechanism 3. The sector 11, subtending an angle of 120° represents the period of time during which the optical path from objective 7 is undeflected by mirror-shutter 9 and an image of the object is in consequence focused in the plane of exposure gate 10. When shutter 9 is turned so as to intercept the optical path and deflect it upwards the film pulldown mechanism operates to draw the next frame of film into the gate. During a part of this interval, which is represented by 240° in the timing diagram, the optical path is at two distinct periods intercepted by mirror-shutter 8 and directed to illuminate television pickup tube 1. These two periods are represented in the diagram by sectors 12, each of 60°. The reason for this double illumination of the pickup tube is to provide similar conditions in the tube during the scanning of the target by the electron beam in each of the two interlaced scans which now conventionally form a complete picture. During the remaining period of 120° the optical finder is illuminated. It will, however, often be found advantageous to interrupt the period of illumination of the finder by a brief dark interval in order to avoid flicker. Such an interruption is indicated by the sector 14 in FIGURE 2.

The advantage gained by the use of the present invention may be seen by comparison of FIGURE 2 with FIGURE 3, which shows the operation of a known type of combined television and cinematographic camera. It will be seen that in the known apparatus the exposure of the film is effected during a period represented by the sector 15, which subtends an angle of 120°. During periods of time represented by the sectors 16, each subtending an angle of 60° the television pickup tube and the optical finder are both illuminated by the use of a rotary mirror-shutter and auxiliary optical means—such as a partially-transparent reflector—and during a period represented by sector 17, which subtends an angle of 120° the optical path is unused. In this known arrangement the loss of light is therefore very significant.

It will be seen that both in the known arrangement whose operation is represented by FIGURE 3 and in apparatus according to the present invention, which operates as illustrated by FIGURE 2, the film receives the light available during one third of a film-frame period. On the other hand in the combined television and cinematographic camera according to the invention the television pickup tube and the optical finder each receive approximately twice as much light as in the known arrangement. It may in some cases be desirable to allow relatively more light to reach the film than is applied to the television pickup tube, or even relatively less light. This may be done by varying the period during which the various optical paths are established by the rotary mirror-shutters, but it is desirable that the two periods during which the television pickup tube is illuminated shall continue to be of the same duration.

Figure 4:
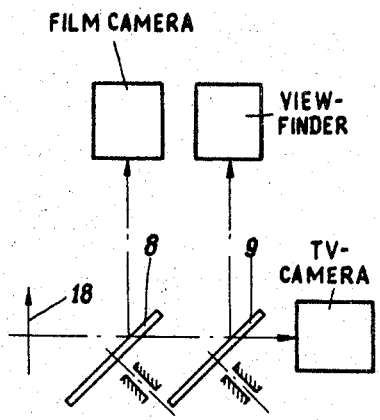

The schematic diagrams given in FIGURES 4 to 7 illustrate several possible arrangements of combined television and cinematographic cameras according to the invention. In FIGURE 4 the optical path originating in the object 18 is at some times reflected by the first rotary mirror-shutter 8 to expose the film in the film camera, while at other times it is allowed to pass unintercepted by shutter 8 and also by the second rotary mirror-shutter 9 to illuminate the pickup tube in the television camera. At still other times the optical path passes shutter 8 but is reflected by shutter 9 to illuminate the view-finder.

Figure 5:
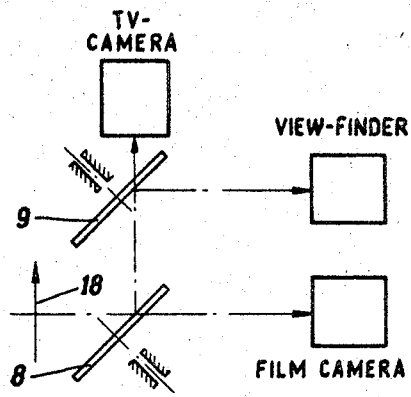

In the arrangement illustrated by FIGURE 5 the optical path extending from the object 18 is sometimes unintercepted by the first shutter 8 and then illuminates the film in the film camera, while at other times it is reflected by shutter 8 and then, according to the position of the second shutter 9, either illuminates the pickup tube in the television camera or is reflected by shutter 9 to illuminate the view-finder.

In the arrangement illustrated by FIGURE 6 the optical path from object 18 illuminates the view-finder when unintercepted by shutters 8 and 9. When intercepted by shutter 9 is reflected to illuminate the pickup tube in the television camera, while when intercepted by shutter 8 it is reflected to illuminate the film in the film camera.

According to FIGURE 7 the optical path from object 18 illuminates the film in the film camera when unintercepted by shutter 8. During the period in which the optical path is reflected by shutter 8 it either passes shutter 9 unintercepted to illuminate the viewfinder or is reflected by shutter 9 to illuminate the pickup tube in the television camera.

As shown in FIGURE 8 it is also possible for the two rotary mirror-shutters to be mounted upon a common shaft. The two mirror-shutters 8, 9 are secured to a single shaft 23 which is driven by an electric motor 24 in the direction shown by the arrows and is mechanically coupled with the film transport mechanism. Since the margins of the mirror shutters 8, 9 are of the different forms shown a beam of light incident in the direction of the arrow 25 is at different times reflected in the direction 26 from shutter 8, reflected in direction 27 from shutter 9, or allowed to pass in the direction 28. In the position illustrated in the figure the light beam is reflected in the direction 26. At a later time, for example after the shutter assembly has rotated through 90°, the light beam is allowed to pass in direction 28. After a further 90° rotation of the shutter assembly the light beam is again reflected in direction 26, after a total of 270° rotation it is reflected in direction 27 and on completion of the cycle it is again reflected in direction 26. This cycle of operations is suitable for a combined television and cinematographic camera in which light reflected in direction 26 passes to the television pickup tube, light passing in direction 28 illuminates the film and light reflected in direction 27 goes to the optical finder.

A combined television and cinematographic camera making use of a shutter assembly of the kind described above in relation to FIGURE 8 is shown in FIGURE 9. Here the optical path from an objective lens 29 passes unintersected by the shutter assembly 30 to expose film situated in the exposure gate 31 of a film pulldown mechanism 32. When shutter assembly 30 has rotated so that the optical path is reflected by shutter 8 the light passes through a further objective 33 and is directed by means of a reflector 34, conveniently a front-silvered mirror, to form an image upon the photosensitive member of a television pickup tube 35, while when the optical path is reflected from shutter 9 it is directed by a reflector 36 into the view-finder 37.

What is claimed as new and desired to be secured by Letters Patent is:

1. In a device in which television and motion picture cameras are combined, in combination, a motion picture camera assembly; a television camera assembly; an optical viewfinder assembly; a single objective means through which light for all of said assemblies passes; and combined shutter and reflector means located at least in part in the path of light which has passed through said objective means for controlling the transmission of the light to said assemblies, said combined shutter and reflector means having an operating cycle during fractional parts of which light is directed to said assemblies with only one assembly receiving light during any one of said fractional parts of said cycle, and the total of all of said fractional parts of said cycle equalling substantially the entire cycle so that there is practically no period during said cycle when light does not reach one of said assemblies.

2. In a device in which television and motion picture cameras are combined, in combination, a motion picture camera assembly; a television camera assembly; an optical viewfinder assembly; a single objective means through which light for all of said assemblies passes; and combined shutter and reflector means located at least in part in the path of light which has passed through said objective means for controlling the transmission of the light to said assemblies, said combined shutter and reflector means having an operating cycle divided into four fractional parts during two of which light is respectively directed to said motion picture camera assembly and said optical viewfinder assembly and during the other two of which light is directed to said television camera assembly with the fractional parts of said cycle during which light is directed to said television camera assembly being separated by the fractional parts thereof during which light is respectively directed to said motion picture camera assembly and said optical viewfinder assembly, so that during any one of said fractional parts of said cycle light reaches only one of said assemblies while the total of all of said fractional parts of said cycle equals substantially the entire cycle, whereby there is practically no period during said cycle when light does not reach one of said assemblies.

3. In a device in which television and motion picture cameras are combined, in combination, a motion picture camera assembly; a television camera assembly; an optical viewfinder assembly; a single objective means through which light for all of said assemblies passes; and combined shutter and reflector means located at least in part in the path of light which has passed through said objective means for controlling the transmission of the light to said assemblies, said combined shutter and reflector means having an operating cycle divided into four fractional parts during two of which light is respectively directed to said motion picture camera assembly and said optical viewfinder assembly and during the other two of which light is directed to said television camera assembly with the fractional parts of said cycle during which light is directed to said television camera assembly being separated by the fractional parts thereof during which light is respectively directed to said motion picture camera assembly and said optical viewfinder assembly, so that during any one of said fractional parts of said cycle light reaches only one of said assemblies while the total of all of said fractional parts of said cycle equals substantially the entire cycle, whereby there is practically no period during said cycle when light does not reach one of said assemblies, said fractional parts of said cycle during which light reaches said television camera assembly, each being equal to approximately one half of each of said fractional parts of said cycle during which light reaches said motion picture camera assembly and said optical viewfinder assembly so that the light is substantially equally distributed between all of said assemblies.

4. In a device in which television and motion picture cameras are combined, in combination, a motion picture camera assembly; a television camera assembly; an optical viewfinder assembly; a single objective means through which light for all of said assemblies passes; and combined shutter and reflector means located at least in part in the path of light which has passed through said objective means for controlling the transmission of light to said assemblies, said combined shutter and reflector means having an operating cycle divided into four fractional parts during two of which light is transmitted substantially continuously to said motion picture camera assembly and said optical viewfinder assembly and during the other two of which light is transmitted to said television camera assembly with the fractional parts of said cycle during which light is transmitted to said television camera assembly being separated by the fractional parts of said cycle during which light is respectively transmitted to said motion picture camera assembly and said optical viewfinder assembly, and said combined shutter and reflector means providing a brief interruption in the transmission of light to said optical viewfinder assembly during that fractional part of said cycle when light is transmitted to said viewfinder assembly so as to prevent flickering of the image seen in viewfinder assembly, whereby light is transmitted to only one of said assemblies during any one fractional part of said cycle while the total of all of said fractional parts of said cycle substantially equals the entire cycle so that there is practically no period during said cycle when light does not reach one of said assemblies.

5. In a device in which television and motion picture cameras are combined, in combination, a motion picture camera assembly; a television camera assembly; an optical viewfinder assembly; a single objective means through which light for all of said assemblies passes; and combined, rotary shutter and reflector means located at least in part in the path of light which has passed through said objective means for controlling the transmission of light to said assemblies, said combined, rotary shutter and reflector means having an operating cycle which extends through a predetermined angle of rotation of said combined shutter and reflecting means and during fractional parts of which light is directed to said assemblies with only one assembly receiving light during any one of said fractional parts of said cycle, and the total of all of said fractional parts of said cycle equalling substantially the entire cycle so that there is practically no period during said cycle when light does not reach one of said assemblies.

6. In a device in which television and motion picture cameras are combined, in combination, a motion picture camera assembly; a television camera assembly; an optical viewfinder assembly; a single objective means through which light for all of said assemblies passes; and combined, rotary shutter and reflector means located at least in part in the path of light which has passed through said objective means for controlling the transmission of light to said assemblies, said combined, rotary shutter and reflecting means having an operating cycle during which said shutter and reflector means rotates through one revolution and during fractional parts of which light is directed to said assemblies with only one assembly receiving light during any one of said fractional parts of said cycle, and the total of all of said fractional parts of said cycle equalling substantially the entire cycle so that there is practically no period during said cycle when light does not reach one of said assemblies.

7. In a device in which television and motion picture cameras are combined, in combination, a motion picture camera assembly; a television camera assembly; an optical viewfinder assembly; a single objective means through which light for all of said assemblies passes; and combined, rotary shutter and reflector means located at least in part in the path of light which has passed through said objective means for controlling the transmission of light to said assemblies, said combined, rotary shutter and reflecting means having an operating cycle during which said combined, rotary shutter and reflector means rotates through a single revolution, and said operating cycle being divided into four parts two of which extend through angles of 120° and the other two of which extend through angles of 60° with said latter two fractional parts of said cycle being separated by said two 120° parts of said cycle, said combined shutter and reflector means transmitting the light respectively to said motion picture camera assembly and said optical viewfinder assembly during said two 120° fractional parts of said cycle and to said television camera assembly during the remaining two parts of said cycle.

8. In a device in which television and motion picture cameras are combined, in combination, a motion picture camera assembly; a television camera assembly; an optical viewfinder assembly; a single objective means through which light for all of said assemblies passes; and combined, rotary shutter and reflector means located at least in part in the path of light which has passed through said objective means for controlling the transmission of the light to said assemblies, said combined, rotary shutter and reflector means having an operating cycle during which said combined, rotary shutter and reflector means turns through a predetermined angle during fractional parts of which light is directed to said assemblies with only one assembly receiving light during any one of said fractional parts, and the total of all of said fractional parts of said cycle equalling substantially the entire cycle so that there is practically no period during said cycle when light does not reach one of said assemblies, said combined, rotary shutter and reflector means including two rotary members each of which acts as a shutter and reflector.

9. In a device in which television and motion picture cameras are combined, in combination, a motion picture camera assembly; a television camera assembly; an optical viewfinder assembly; a single objective means through which light for all of said assemblies passes; and combined, rotary shutter and reflector means located at least in part in the path of light which has passed through said objective means for controlling the transmission of the light to said assemblies, said combined, rotary shutter and reflector means having an operating cycle during which said combined, rotary shutter and reflector means turns through a predetermined angle during fractional parts of which light is directed to said assemblies with only one assembly receiving light during any one of said fractional parts, and the total of all of said fractional parts of said cycle equalling substantially the entire cycle so that there is practically no period during said cycle when light does not reach one of said assemblies, said combined, rotary shutter and reflector means including two rotary members each of which acts as a shutter and reflector, said two rotary members respectively having different axes of rotation.

10. In a device in which television and motion picture cameras are combined, in combination, a motion picture camera assembly; a television camera assembly; an optical viewfinder assembly; a single objective means through which light for all of said assemblies passes; and combined, rotary shutter and reflector means located at least in part in the path of light which has passed through said objective means for controlling the transmission of the light to said assemblies, said combined, rotary shutter and reflector means having an operating cycle during which said combined, rotary shutter and reflector means turns through a predetermined angle during fractional parts of which light is directed to said assemblies with only one assembly receiving light during any one of said fractional parts, and the total of all of said fractional parts of said cycle equalling substantially the entire cycle so that there is practically no period during said cycle when light does not reach one of said asemblies, said combined, rotary shutter and reflector means including two rotary members each of which acts as a shutter and reflector, said two rotary members respectively having different axes of rotation which are parallel to each other.

11. In a device in which television and motion picture cameras are combined, in combination, a motion picture camera assembly; a television camera assembly; an optical viewfinder assembly; a single objective means through which light for all of said assemblies passes; and combined, rotary shutter and reflector means located at least in part in the path of light which has passed through said objective means for controlling the transmission of the light to said assemblies, said combined, rotary shutter and reflector means having an operating cycle during which said combined, rotary shutter and reflector means turns through a predetermined angle during fractional parts of which light is directed to said assemblies with only one assembly receiving light during any one of said fractional parts, and the total of all of said fractional parts of said cycle equalling substantially the entire cycle so that there is practically no period during said cycle when light does not reach one of said assemblies, said combined, rotary shutter and reflector means including two rotary members each of which acts as a shutter and reflector, said two rotary members having a common axis of rotation.

12. In a device in which television and motion picture cameras are combined, in combination, a motion picture camera assembly; a television camera assembly; an optical viewfinder assembly; a single objective means through which light for all of said assemblies passes; and combined, rotary shutter and reflector means located at least in part in the path of light which has passed through said objective means for controlling the transmission of the light to said assemblies, said combined, rotary shutter and reflector means having an operating cycle during which said combined, rotary shutter and reflector means turns through a predetermined angle during fractional parts of which light is directed to said assemblies with only one assembly receiving light during any one of said fractional parts, and the total of all of said fractional parts of said cycle equalling substantially the entire cycle so that there is practically no period during said cycle when light does not reach one of said assemblies, said combined, rotary shutter and reflector means including two rotary members each of which acts as a shutter and reflector, said two rotary members having a common axis of rotation and being coupled to each other for rotation together.

13. In a device in which television and motion picture cameras are combined, in combination, a motion picture camera assembly; a television camera assembly; an optical viewfinder assembly; a single objective means through which light for all of said assemblies passes; and combined shutter and reflector means located at least in part in the path of light which has passed through said objective means for controlling the transmission of light to said assemblies, said combined shutter and reflector means having an operating cycle during fractional parts of which light is directed to said assemblies with only one assembly receiving light during any one of said fractional parts of said cycle, and the total of all said fractional parts of said cycle equalling substantially the entire cycle so that there is practically no period during said cycle when light does not reach one of said assemblies, said combined shutter and reflector means directing light to said optical viewfinder assembly during only one of said fractional parts of said cycle and briefly interrupting the transmission of light to said optical viewfinder assembly substantially midway in said one fractional part of said cycle.

14. In a device in which television and motion picture cameras are combined, in combination, a motion picture camera assembly; a television camera assembly; an optical viewfinder assembly; a single objective means through which light for all of said assemblies passes; and combined shutter and reflector means located at least in part in the path of light which has passed through said objective means for controlling the transmission of the light to said assemblies, said combined shutter and reflector means having an operating cycle during fractional parts of which light is directed to said assemblies with only one assembly receiving light during any one of said fractional parts of said cycle, and the total of all of said fractional parts of said cycle equalling substantially the entire cycle so that there is practically no period during said cycle when light does not reach one of said assemblies, said combined shutter and reflector means transmitting light respectively to said assemblies during a period of time which for each assembly substantially equals one third of said operating cycle, so that substantially one third of the total light passing through said objective means reaches each assembly.

References Cited in the file of this patent

UNITED STATES PATENTS

| | | |
|---|---|---|
| 2,709,391 | Reeves | May 31, 1955 |
| 2,982,171 | Debrie | May 2, 1961 |